(12) United States Patent
Kouzu et al.

(10) Patent No.: US 11,251,421 B2
(45) Date of Patent: *Feb. 15, 2022

(54) NEGATIVE ELECTRODE MATERIAL FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: HITACHI CHEMICAL COMPANY, LTD., Tokyo (JP)

(72) Inventors: Masayuki Kouzu, Hitachi (JP); Hideyuki Tsuchiya, Hitachi (JP); Katsutomo Ohzeki, Chiba (JP); Yoshie Oosaki, Chiba (JP); Tatsuya Nishida, Hitachi (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/930,498

(22) Filed: May 13, 2020

(65) Prior Publication Data
US 2020/0280053 A1 Sep. 3, 2020

Related U.S. Application Data

(62) Division of application No. 14/437,674, filed as application No. PCT/JP2013/079036 on Oct. 25, 2013, now Pat. No. 10,693,130.

(30) Foreign Application Priority Data

Oct. 26, 2012 (JP) ................................ 2012-237256

(51) Int. Cl.
H01M 4/36 (2006.01)
H01M 4/131 (2010.01)
(Continued)

(52) U.S. Cl.
CPC ........... H01M 4/366 (2013.01); H01M 4/131 (2013.01); H01M 4/133 (2013.01); H01M 4/386 (2013.01);
(Continued)

(58) Field of Classification Search
CPC ....................................... H01M 4/366
See application file for complete search history.

(56) References Cited

U.S. PATENT DOCUMENTS

2004/0137328 A1 7/2004 Kim et al.
2009/0202911 A1 8/2009 Fukuoka
(Continued)

FOREIGN PATENT DOCUMENTS

EP 2372816 A1 10/2011
EP 2509139 A1 10/2012
(Continued)

OTHER PUBLICATIONS

Extended Search Report of EP Appln. No. 13848864.8 dated May 9, 2016 in English.
(Continued)

*Primary Examiner* — Stephan J Essex
(74) *Attorney, Agent, or Firm* — Fitch, Even, Tabin & Flannery, LLP

(57) ABSTRACT

A negative electrode material for a lithium ion secondary battery including carbon over a part or a whole of a surface of an oxide of silicon, in which the content of the carbon is from 0.5 mass-% to less than 5 mass-%.

18 Claims, 3 Drawing Sheets

(51) Int. Cl.
  H01M 4/133 (2010.01)
  H01M 4/38 (2006.01)
  H01M 4/485 (2010.01)
  H01M 4/62 (2006.01)
  H01M 4/587 (2010.01)
  H01M 10/0525 (2010.01)
  H01M 4/02 (2006.01)

(52) U.S. Cl.
  CPC ........... H01M 4/485 (2013.01); H01M 4/625 (2013.01); *H01M 4/364* (2013.01); *H01M 4/587* (2013.01); *H01M 10/0525* (2013.01); *H01M 2004/027* (2013.01)

(56) References Cited

U.S. PATENT DOCUMENTS

| | | |
|---|---|---|
| 2009/0311606 A1 | 12/2009 | Fukuoka et al. |
| 2010/0009261 A1 | 1/2010 | Watanabe |
| 2011/0318631 A1 | 12/2011 | Nomura |
| 2012/0107679 A1 | 5/2012 | Taniguchi et al. |
| 2012/0288742 A1 | 11/2012 | Tanaka et al. |
| 2013/0149606 A1 | 6/2013 | Yasuda |

FOREIGN PATENT DOCUMENTS

| | | |
|---|---|---|
| EP | 2597708 A1 | 5/2013 |
| EP | 2618407 A1 | 7/2013 |
| JP | 3952180 B2 | 8/2007 |
| JP | 4171897 B2 | 10/2008 |
| JP | 2009301935 A | 12/2009 |
| JP | 2010-225494 A | 10/2010 |
| JP | 2011-076788 A | 4/2011 |
| JP | 2011090869 A | 5/2011 |
| JP | 2011-222151 A | 11/2011 |
| JP | 2012094369 A | 5/2012 |
| JP | 2013110105 A | 6/2013 |
| JP | 2013-258032 A | 12/2013 |
| KR | 10-2009-0130824 A | 12/2009 |
| WO | 2012011247 A1 | 1/2012 |
| WO | 201206127 A1 | 3/2012 |
| WO | 2012026067 A1 | 3/2012 |
| WO | 2012049826 A1 | 4/2012 |
| WO | 2012/077268 A1 | 6/2012 |
| WO | 2012/077785 A1 | 6/2012 |
| WO | 2012077268 A1 | 6/2012 |

OTHER PUBLICATIONS

Office Action of Taiwan Appln. No. 10620892970 dated Aug. 30, 2017 with English translation.
Yong-Sheng Hu, et al., "Superior Storage Performance of a Si@SiOx/C Nanocomposite as Anode Material for Lithium-Ion Batteries," Angew.Chem.Int.Ed., 2008, 47, pp. 1645-1649 (cited in office action in counterpart Korean application dated Oct. 1, 2019).
International Search Report for International Application No. PCT/JP2013/079036 dated Jan. 28, 2014 with English translation.

[Fig. 1]
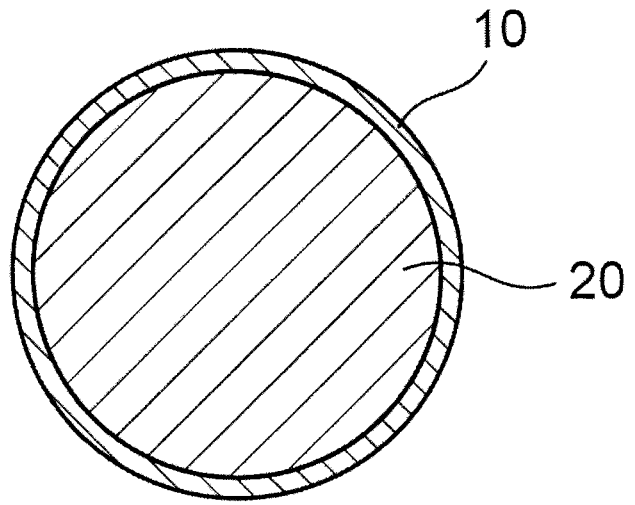
[Fig. 2]
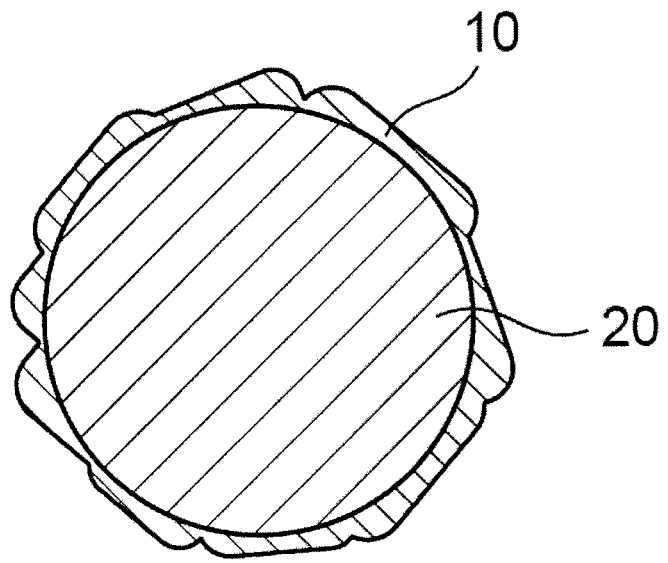

[Fig. 3]
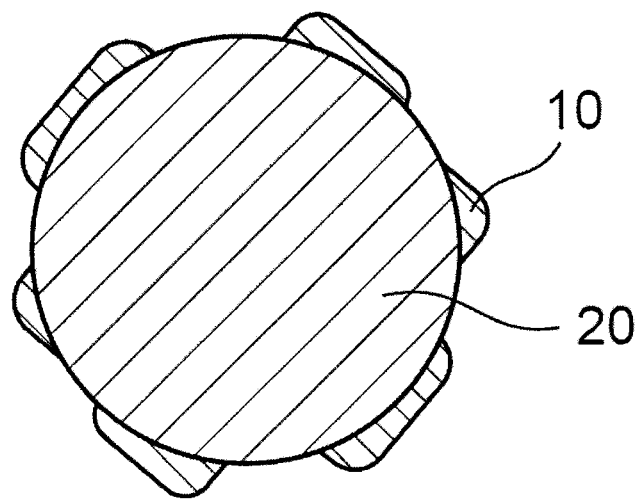
[Fig. 4]
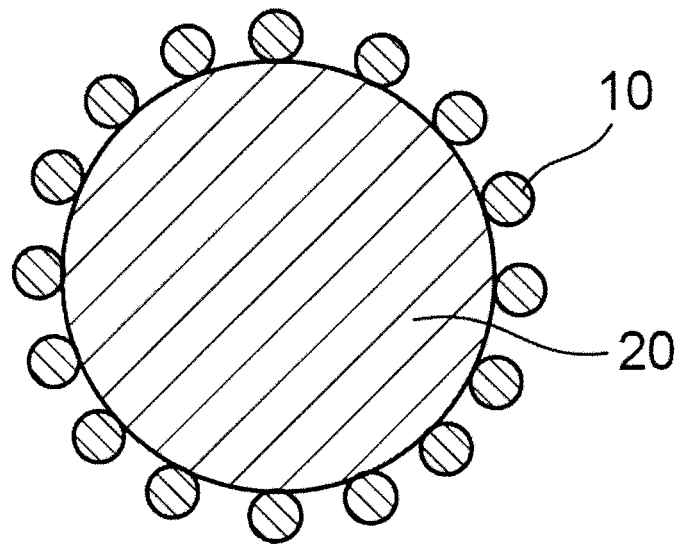

[Fig. 5]
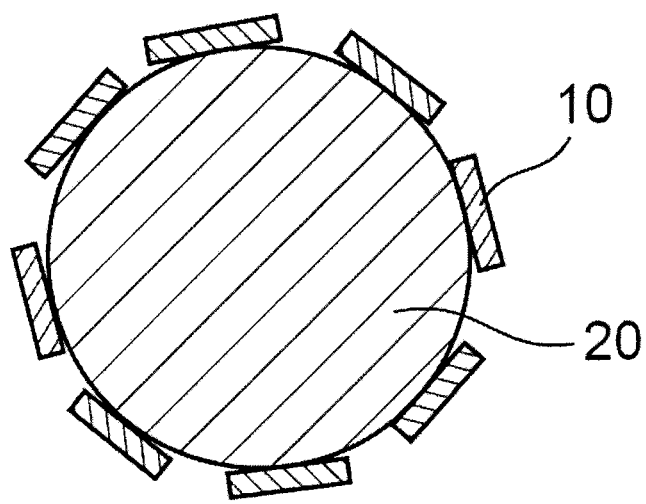
[Fig. 6A]
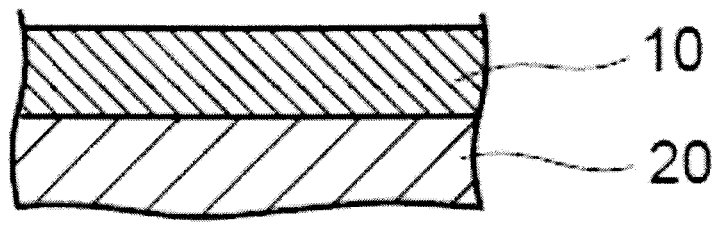
[Fig. 6B]
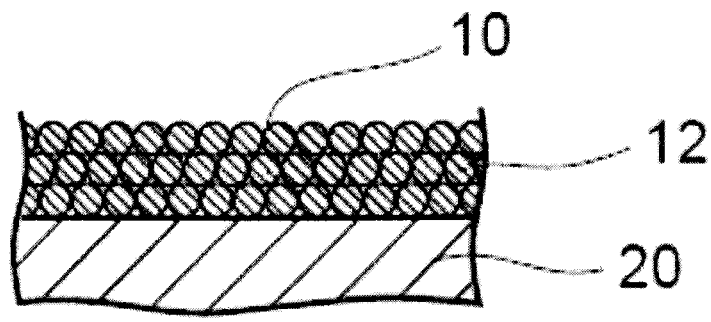

NEGATIVE ELECTRODE MATERIAL FOR LITHIUM ION SECONDARY BATTERY, NEGATIVE ELECTRODE FOR LITHIUM ION SECONDARY BATTERY, AND LITHIUM ION SECONDARY BATTERY

CROSS-REFERENCE TO RELATED APPLICATIONS

This application is a divisional application of U.S. application Ser. No. 14/437,674 filed Apr. 22, 2015, which is a national stage entry under 35 U.S.C. § 371 of International Application No. PCT/JP2013/079036, filed Oct. 25, 2013, which claims priority to JP 2012-237256, filed Oct. 26, 2012, the contents of each of which are incorporated herein by reference.

TECHNICAL FIELD

The present invention relates to a negative electrode material for a lithium ion secondary battery, a negative electrode for a lithium ion secondary battery, and a lithium ion secondary battery.

BACKGROUND ART

Although presently graphite is mainly used as a negative electrode material for a lithium ion secondary battery, it has been known that there exists a theoretical capacity limitation of 372 mAh/g in discharge capacity with respect to graphite. Since mobile devices, such as a cell phone, a notebook computer, and a tablet terminal, have come to have higher performance in recent years, a demand for a higher capacity lithium ion secondary battery has become stronger, and a negative electrode material, which can attain still higher capacity of a lithium ion secondary battery, has been sought-after.

Consequently, development of a negative electrode material containing an element, which has high theoretical capacity and ability for absorption and desorption of a lithium ion (hereinafter also referred to as "specific element", and that containing the specific element is also referred to as "specific element substance"), has become active.

As the specific element, silicon, tin, lead, aluminum, etc. are well known. Among others, an oxide of silicon, which is one of the specific element substances, has advantages over a negative electrode material composed of other specific element substances, owing to higher capacity, lower cost, and better processibility, and negative electrode materials containing the same are especially energetically studied.

Meanwhile, the specific element substances are known to cause remarkable cubical expansion when alloyed by charging. Such cubical expansion micronizes a specific element substance itself, and further destroys the structure of a negative electrode material using the same, leading to a breakage of the electrical conductivity. Therefore it has a drawback in that the capacity decreases significantly over cycles.

With respect to the drawbacks, for example, Japanese Patent No. 3952180 discloses an electroconductive silicon complex for a negative electrode material for a nonaqueous electrolyte secondary battery, which is characterized in that a diffraction peak assignable to Si (111) is observed in X-ray diffraction, the crystal size of silicon determined by the Scherrer method based on the half width of the diffraction line is from 1 to 500 nm, and the surface of a particle having a structure where silicon crystallites are dispersed in a silicon compound is coated with carbon.

Japanese Patent No. 3952180 claims that the technology thereof can yield not only surface electroconductivity but also a structure stable against volume change due to absorption and release of lithium, and as the result improvement in long term stability and initial efficiency, by dispersing crystallites or fine particles of silicon in an inert rigid substance, for example, silicon dioxide, and fusing carbon over at least a part of the surface thereof for imparting electrical conductivity.

Japanese Patent No. 4171897 discloses a negative electrode material for a nonaqueous electrolyte secondary battery characterized in that the material is an electroconductive powder composed of a material which can absorb and release a lithium ion, and the surface of which is coated with a graphite film, and that the amount of the graphite coat is from 3 to 40 weight-%, the BET specific surface area is from 2 to 30 m$^2$/g, and the graphite film shows spectra characteristic of a graphite structure near 1330 cm$^{-1}$ and 1580 cm$^{-1}$ of Raman shift in a Raman spectrum.

Japanese Patent No. 4171897 claims that the technology thereof can yield a negative electrode for a lithium ion secondary battery which can achieve a quality level demanded from the market, by regulating physical properties of a graphite film coated on the surface of a material, which can absorb and release a lithium ion, within a specific range.

Japanese Patent Application Laid-Open (JP-A) No. 2011-90869 discloses a negative electrode material for a nonaqueous electrolyte secondary battery, which is a negative electrode material to be used in a negative electrode for a secondary battery using a nonaqueous electrolyte, characterized in that the negative electrode material is composed of a particle of silicon oxide expressed by a general formula of $SiO_x$ whose surface is coated with a carbon film, and the carbon film is treated with a thermal plasma.

JP-A No. 2011-90869 claims that the technology thereof can yield a negative electrode material effective for a nonaqueous electrolyte secondary battery negative electrode, which has removed drawbacks of silicon oxide in expansion of an electrode and expansion of a battery by gas generation, and is superior in cycle performance.

SUMMARY OF INVENTION

Technical Problem

However, when an oxide of silicon, which is one of the specific element substances, is used as a negative electrode material, the initial charge and discharge efficiency is low, and excessive battery capacity of a positive electrode is required for application to an actual battery, and therefore a character of high capacity of an oxide of silicon has not been fully utilized in an actual lithium ion secondary battery according to conventional art. Further, as a negative electrode material to be applied to a lithium ion secondary battery usable for a higher performance mobile device, etc., it is necessary that the material can not only store a large amount of lithium ions (namely the charge capacity is high), but also release a larger amount of the stored lithium ions. Therefore, for a negative electrode material, which can contribute to further improvement of lithium ion secondary battery performance, both of improvement of initial discharge capacity and improvement of initial charge and discharge efficiency become important.

The present invention is made in view of the above needs, with an object to provide a negative electrode material for a lithium ion secondary battery, a negative electrode for a lithium ion secondary battery, and a lithium ion secondary battery, which are superior in initial discharge capacity as well as initial charge and discharge efficiency.

Solution to Problem

Specific means for achieving the object are as follows.

<1> A negative electrode material for a lithium ion secondary battery, including carbon over a part or a whole of a surface of an oxide of silicon, wherein the content of the carbon is from 0.5 mass-% to less than 5 mass-%.

<2> The negative electrode material for a lithium ion secondary battery according to <1> above, wherein the carbon includes low crystallinity carbon.

<3> The negative electrode material for a lithium ion secondary battery according to <1> or <2> above, wherein a diffraction peak assignable to Si (111) is observed when the negative electrode material is subjected to a powder X-ray diffraction (XRD) analysis.

<4> A negative electrode for a lithium ion secondary battery, including:

a current collector; and a negative electrode material layer provided on the current collector and including the negative electrode material according to any one of <1> to <3> above.

<5> A lithium ion secondary battery, including:

a positive electrode;

the negative electrode for a lithium ion secondary battery according to <4> above; and an electrolyte.

Advantageous Effects of Invention

The present invention can provide a negative electrode material for a lithium ion secondary battery, a negative electrode for a lithium ion secondary battery, and a lithium ion secondary battery, which are superior in initial discharge capacity as well as initial charge and discharge efficiency.

BRIEF DESCRIPTION OF DRAWINGS

FIG. 1 is a schematic cross-sectional view showing an example of the constitution of a negative electrode material according to the invention.

FIG. 2 is a schematic cross-sectional view showing another example of the constitution of a negative electrode material according to the invention.

FIG. 3 is a schematic cross-sectional view showing still another example of the constitution of a negative electrode material according to the invention.

FIG. 4 is a schematic cross-sectional view showing still another example of the constitution of a negative electrode material according to the invention.

FIG. 5 is a schematic cross-sectional view showing still another example of the constitution of a negative electrode material according to the invention.

FIG. 6A is an enlarged cross-sectional view of a part of the negative electrode material according to FIG. 1 to FIG. 3, which is an illustrative diagram of an embodiment of the state of carbon 10 in the negative electrode material.

FIG. 6B is an enlarged cross-sectional view of a part of the negative electrode material according to FIG. 1 to FIG. 3, which is an illustrative diagram of another embodiment of the state of carbon 10 in the negative electrode material.

DESCRIPTION OF EMBODIMENTS

A numerical range expressed by "a to b" means herein a range defined by a and b as the minimum value and the maximum value respectively.

Further, with respect to the content of each component in a composition, if plural substances exist corresponding to a component in the composition, the content means herein, unless otherwise specified, the total amount of the plural substances existing in the composition.

<Negative Electrode Material for Lithium Ion Secondary Battery>

A negative electrode material for a lithium ion secondary battery according to the invention (hereinafter occasionally abbreviated as "negative electrode material") contains carbon over a part or a whole of a surface of an oxide of silicon, wherein the content of the carbon is from 0.5 mass-% to less than 5 mass-%. With such a constitution, expansion and contraction on an occasion of absorption and release of a lithium ion can be reduced, and decrease in capacity per unit mass of an oxide of silicon can be suppressed, and therefore the initial discharge capacity and the initial charge and discharge efficiency can be superior.

(Oxide of Silicon)

As an oxide of silicon according to the invention, any oxide containing a silicon element is usable, and examples thereof include silicon monoxide (also called as "silicon oxide"), silicon dioxide, and silicon suboxide. They may be used singly, or in a combination of plural kinds.

Although silicon oxide and silicon dioxide among oxides of silicon are expressed generally as silicon monoxide (SiO) and silicon dioxide ($SiO_2$) respectively, they may be sometimes expressed by a compositional formula SiOx (x is 0<x≤2) according to a found value (or a reduced value) of composing elements depending on a surface condition (for example, presence of an oxidation film), or a formation condition of a compound, which are also understood as oxides of silicon according to the invention. In this regard, the value of x can be calculated by analyzing quantitatively the oxygen content in an oxide of silicon, for example, by an inert gas fusion non-dispersive infrared absorption method. Further, in the event that a disproportionation reaction of an oxide of silicon ($2SiO \rightarrow Si + SiO_2$) is included in a process for producing a negative electrode material according to the invention, the product may appear in some cases, due to a chemical reaction, in a state containing silicon and silicon dioxide (occasionally silicon oxide), which is also understood as an oxide of silicon according to the invention.

Meanwhile, silicon oxide can be obtained, for example, by a publicly known sublimation process, by which a mixture of silicon dioxide and metallic silicon is heated to form a gas of silicon monoxide, and the gas is cooled to deposit. Further, silicon oxide is available on the market as silicon oxide, silicon monoxide, etc.

For a negative electrode material according to the invention, an oxide of silicon has preferably a structure, in which silicon crystallites are dispersed in the oxide of silicon. In the oxide of silicon having a structure with dispersed silicon crystallites, a diffraction peak assignable to Si (111) is observed near $2\theta = 28.4°$, when a powder X-ray diffraction (XRD) analysis is performed. In a case in which silicon crystallites are present in an oxide of silicon, it becomes easier to achieve higher initial discharge capacity and higher initial charge and discharge efficiency.

The crystallite size of silicon is preferably 8 nm or less, and more preferably 6 nm or less. When the crystallite size is 8 nm or less, a silicon crystallite is not apt to localize in an oxide of silicon, and a lithium ion can diffuse easily in an oxide of silicon so as to facilitate achievement of excellent discharge capacity.

The crystallite size of silicon is preferably 2 nm or more, and more preferably 3 nm or more. When the crystallite size is 2 nm or more, a reaction between a lithium ion and an oxide of silicon can be controlled so as to facilitate achievement of excellent charge and discharge efficiency.

The crystallite size of silicon can be determined using the Scherrer equation based on the half width of a diffraction peak near $2\theta=28.4°$ assignable to Si (111) obtained by a powder X-ray diffraction analysis using a radiation source of the CuKα line having a wavelength of 0.154056 nm.

A structure, in which silicon crystallites are dispersed in an oxide of silicon, can be formed, for example, by heat-treating an oxide of silicon in an inert atmosphere in a temperature range from 700° C. to 1300° C. to allow disproportionation. Further, it may be formed by adjusting the heating temperature at a heat treatment for adding carbon to an oxide of silicon as described below. The higher the heating temperature at the heat treatment becomes, and the longer the heating time becomes, the larger the silicon crystallite size tends to become.

When a lump of an oxide of silicon in a size of several cm square is prepared, it should preferably be milled and classified. More precisely, the oxide should be preferably subjected first to primary crushing to a size allowing supply to a pulverizing mill and classification, and then to secondary milling by a pulverizing mill. The average particle size of the product particle of an oxide of silicon of the secondary milling is preferably from 0.1 μm to 20 μm according to a desired final size of the negative electrode material, and more preferably from 0.5 μm to 10 μm. The average particle size is a diameter at 50% cumulative volume of a particle size distribution (D50%). This holds true for an expression of an average particle size below. For measuring an average particle size, a heretofore known method such as a laser diffraction particle size distribution analyzer may be used.

A negative electrode material according to the invention contains carbon over a part or a whole of a surface of an oxide of silicon, wherein the content of the carbon with respect to a whole negative electrode material is from 0.5 mass-% to less than 5 mass-%. With such a constitution, the initial discharge capacity and the initial charge and discharge efficiency are improved. The carbon content with respect to a whole negative electrode material is preferably from 0.5 mass-% to 4.5 mass-%, and more preferably from 0.5 mass-% to 4.0 mass-%.

The carbon content (by mass) in a whole negative electrode material can be determined by a microwave calcination-infrared analysis method. For a microwave calcination-infrared analysis method, for example, a carbon/sulfur determinator (CSLS600, made by Leco Japan Corporation) may be used.

A negative electrode material according to the invention contains carbon over a part or a whole of a surface of an oxide of silicon. FIG. 1 to FIG. 4 are schematic cross-sectional views showing examples of the constitution of a negative electrode material according to the invention. In FIG. 1 carbon 10 coats the whole surface of an oxide of silicon 20. In FIG. 2 carbon 10 coats the whole surface of an oxide of silicon 20, but does not cover it uniformly. In FIG. 3, carbon 10 is present partially on the surface of an oxide of silicon 20, and a part of the surface of the oxide of silicon 20 is exposed. In FIG. 4, particles of carbon 10 having a particle size less than an oxide of silicon 20 are present on the surface of an oxide of silicon 20. FIG. 5 is a variation of FIG. 4, in which the particle shape of carbon 10 is squamous. Although the shape of an oxide of silicon 20 is depicted schematically spherical (the cross-sectional shape is circular) in FIG. 1 to FIG. 5, it may have any of spherical, blockish, squamous, or cross-sectionally polygonal (angulated) shapes.

FIG. 6A and FIG. 6B are enlarged cross-sectional views of a part of the negative electrode material according to FIG. 1 to FIG. 3, and FIG. 6A illustrates an embodiment of the shape of carbon 10 in a negative electrode material and FIG. 6B illustrates another embodiment of the shape of carbon 10 in a negative electrode material. In the cases in FIG. 1 to FIG. 3, the carbon 10 may be entirely constituted with carbon as shown in FIG. 6A, or the carbon 10 may be constituted with fine particles 12 as shown in FIG. 6B. Although FIG. 6B depicts a state where the contour of a fine particle 12 remains intact, the fine particles 12 may be bonded each other. When the fine particles 12 are bonded each other, the carbon 10 may be entirely constituted with carbon, or voids may be included in a part of the carbon 10. Namely, the carbon 10 may partly include voids.

When the carbon 10 is particles, the particles of the carbon 10 may be present only on a part of the surface of an oxide of silicon 20 and another part of the surface of an oxide of silicon 20 may be exposed as shown in FIG. 4, or the particles of the carbon 10 may be present over the entire surface of an oxide of silicon 20 as shown in FIG. 6B.

The carbon is preferably low crystalline. Low crystallinity means that the following R value is 0.5 or more.

Defining the intensity of a peak appearing near 1360 $cm^{-1}$ as Id, the intensity of a peak appearing near 1580 $cm^{-1}$ as Ig in a profile obtained by laser Raman spectrometry with an excitation wavelength of 532 nm, and the intensity ratio of both the peaks Id/Ig (expressed also as D/G) as R value, the carbon should preferably has an R value from 0.5 to 1.5, more preferably from 0.7 to 1.3, and further preferably from 0.8 to 1.2.

When R value is 0.5 or more, high discharge capacity tends to be obtainable, and when it is 1.5 or less, increase in irreversible capacity tends to be suppressible.

In this regard, a peak appearing near 1360 $cm^{-1}$ is ordinarily identified as a peak assignable to an amorphous carbon structure, and means, for example, a peak observed between 1300 $cm^{-1}$ and 1400 $cm^{-1}$; while a peak appearing near 1580 $cm^{-1}$ is ordinarily identified as a peak assignable to a crystal graphite structure, and means, for example, a peak observed between 1530 $cm^{-1}$ and 1630 $cm^{-1}$.

R value can be determined by a Raman spectrum analyzer (e.g. NSR-1000 Model with excitation wavelength 532 nm, made by Jasco Corporation) with respect to a measurement range from 830 $cm^{-1}$ to 1940 $cm^{-1}$ based on a baseline between 1050 $cm^{-1}$ and 1750 $cm^{-1}$.

Although there is no particular restriction on a method for adding carbon onto the surface of an oxide of silicon, and examples thereof include a wet mixing method, a dry mixing method, and a chemical vapor deposition method. From viewpoints of homogeneity, easier regulation of a reaction system, and preservation of a negative electrode material shape, a wet mixing method or a dry mixing method is preferable.

In the case of a wet mixing method, carbon can be added onto the surface of an oxide of silicon, for example, by mixing an oxide of silicon and a solution dissolving a carbon source in a solvent so as to stick the carbon source solution to the surface of an oxide of silicon, if necessary removing the solvent, and then preforming a heat treatment in an inert atmosphere to carbonize the carbon source. In a case in which a carbon source cannot be dissolved in a solvent, the carbon source may be also dispersed in a dispersing medium to form a dispersion liquid.

In the case of a dry mixing method, carbon can be added onto the surface of an oxide of silicon, for example, by mixing two solids of an oxide of silicon and a carbon source to form a mixture, and then heat-treating the mixture in an inert atmosphere to carbonize the carbon source. When an oxide of silicon and a carbon source are mixed, a treatment for adding mechanical energy (for example, a mechano-chemical treatment) may be performed.

In the case of a chemical vapor deposition method, a publicly known method may be applied for adding carbon onto the surface of an oxide of silicon, for example, by heat-treating an oxide of silicon in an atmosphere containing a gas prepared by vaporizing a carbon source.

There is no particular restriction on the carbon source, insofar as it is a compound from which carbon can be remained after a heat treatment, when carbon is added onto the surface of an oxide of silicon by the methods, and specific examples thereof include polymers, such as a phenolic resin, a styrenic resin, poly(vinyl alcohol), poly(vinyl chloride), poly(vinyl acetate), and poly(butyral); pitches, such as ethylene heavy end pitch, coal pitch, petroleum pitch, coal tar pitch, asphalt cracking pitch, PVC pitch formed by thermal decomposition of poly(vinyl chloride), etc., and naphthalene pitch formed by polymerization of naphthalene, etc. in the presence of a super strong acid; and polysaccharides, such as starch, and cellulose. The carbon sources may be used singly, or in a combination of 2 or more kinds.

In a case in which carbon is added by a chemical vapor deposition method, a gaseous or an easily vaporizable compound among an aliphatic hydrocarbon, an aromatic hydrocarbon, an alicyclic hydrocarbon, and the like is preferably used as a carbon source. Specific examples thereof include methane, ethane, propane, toluene, benzene, xylene, styrene, naphthalene, cresol, anthracene, and derivatives thereof. The carbon sources may be used singly, or in a combination of 2 or more kinds.

There is no particular restriction on a heat treatment temperature for carbonizing a carbon source, insofar as a carbon source can be carbonized at the temperature, and it is preferably 700° C. or higher, more preferably 800° C. or higher, and further preferably 900° C. or higher. From viewpoints of making carbon low crystalline and forming the silicon crystallite having a desired size, the temperature is preferably 1300° C. or lower, more preferably 1200° C. or lower, and further preferably 1100° C. or lower.

A heat treatment time may be selected appropriately according to the type of a carbon source or the addition amount thereof, and it is preferably, for example, from 1 hour to 10 hours, and more preferably from 2 hours to 7 hours.

A heat treatment is preferably carried out in an inert atmosphere, such as nitrogen, and argon. There is no particular restriction on a heat treatment apparatus, insofar as it is a reaction apparatus equipped with a heating mechanism. Examples thereof include a heating apparatus, which can be operated by a continuous process, a batch-wise process, etc. Specifically, it can be selected appropriately according to an aim from a fluidized bed reaction oven, a rotary oven, a vertical moving bed reaction oven, a tunnel oven, a batch-wise oven, etc.

Since in a heat-treated product obtained from the heat treatment individual particles may coagulate together, it is preferable to conduct a disintegration treatment. In a case in which adjustment to a desired average particle size is necessary, a grinding treatment may be further performed.

As an example of another method for adding carbon onto the surface of an oxide of silicon, there is a method using a carbonaceous material, such as amorphous carbon including soft carbon and hard carbon; and graphite, as carbon to be added onto the surface of an oxide of silicon. By this method a negative electrode material configured such that carbon 10 is present as particles over the surface of an oxide of silicon 20 as shown in FIG. 4 and FIG. 5 can be also prepared. As a method for using the carbonaceous material, the wet mixing method or the dry mixing method as above can be applied.

In a case in which a wet mixing method is applied, a fine particle of a carbonaceous material and an organic compound (a compound leaving carbon after a heat treatment) to function as a binder are mixed to form a mixture, the mixture and an oxide of silicon are mixed further so that the mixture sticks to the surface of the oxide of silicon, which is then heat-treated to complete production. There is no particular restriction on the organic compound, insofar as it is a compound which can leave carbon after a heat treatment. As a heat treatment condition in a case in which a wet mixing method is applied, a heat treatment condition for carbonizing the carbon source can be applied.

In a case in which a dry mixing method is applied, two solids of a fine particle of a carbonaceous material and an oxide of silicon are mixed together to form a mixture, which is then subjected to a treatment for adding mechanical energy (for example, a mechanochemical treatment) to complete production. Also in a case in which a dry mixing method is applied, it is preferable that a heat treatment is carried out so as to form silicon crystallites in an oxide of silicon. As a heat treatment condition in a case in which a dry mixing method is applied, a heat treatment condition for carbonizing the carbon source can be applied.

The volume-based average particle size of a negative electrode material according to the invention is preferably from 0.1 μm to 20 μm, and more preferably from 0.5 μm to 10 μm. When the average particle size is 20 μm or less, the distribution of a negative electrode material in a negative electrode can become homogeneous, and moreover expansion and contraction during charging and discharging can become uniform, and therefore decrease in cycle performance tends to be suppressed. Meanwhile, when the average particle size is 0.1 μm or more, the negative electrode density tends to increase, and higher capacity tends to be available.

The specific surface area of a negative electrode material according to the invention is preferably from 0.1 $m^2/g$ to 15 $m^2/g$, more preferably from 0.5 $m^2/g$ to 10 $m^2/g$, and further preferably from 1.0 $m^2/g$ to 7 $m^2/g$. When the specific surface area is 15 $m^2/g$ or less, increase in the first irreversible capacity of a product lithium ion secondary battery tends to be suppressed. Further, increase in the consumption of a binder during producing a negative electrode tends to be suppressed. When the specific surface area is 0.1 $m^2/g$ or more, the contact area with an electrolyte solution increases and the charge and discharge efficiency tends to increase. For measuring a specific surface area, a heretofore known method such as a BET method (a nitrogen gas adsorption method) can be utilized.

With respect to a negative electrode material according to the invention, preferably the carbon content is from 0.5 mass-% to less than 5 mass-%, and the silicon crystallite size is from 2 nm to 8 nm, and more preferably the carbon content is from 0.5 mass-% to 4.5 mass-%, and the silicon crystallite size is from 3 nm to 6 nm.

The negative electrode material may be used, if necessary, together with a heretofore known carbonaceous negative electrode material as an active material for a negative electrode of a lithium ion secondary battery. According to the type of a carbonaceous negative electrode material to be used together, improvement in the charge and discharge efficiency, improvement in the cycle performance, an inhibitory effect on electrode expansion, or the like can be obtained.

Examples of a heretofore known carbonaceous negative electrode material include natural graphite, such as squamous natural graphite, spherical natural graphite prepared by spherizing squamous natural graphite, artificial graphite, and amorphous carbon. The carbonaceous negative electrode material may further contain carbon on a part or a whole of the surface. The carbonaceous negative electrode materials may be used singly, or in a combination of plural kinds, as mixed with the above negative electrode material according to the invention.

When a negative electrode material according to the invention is used in a combination with a carbonaceous negative electrode material, the ratio of a negative electrode material according to the invention (denoted as "SiO—C") to a carbonaceous negative electrode material (denoted as "C"), namely SiO—C:C, may be adjusted appropriately according to an aim, and it is from a viewpoint of an inhibitory effect on expansion of an electrode preferably, for example, from 0.1:99.9 to 20:80 by mass, more preferably from 0.5:99.5 to 15:85, and further preferably from 1:99 to 10:90.

<Negative Electrode for Lithium Ion Secondary Battery>

A negative electrode for a lithium ion secondary battery according to the invention (hereinafter occasionally abbreviated as "negative electrode") includes a current collector, and a negative electrode material layer provided on the current collector and containing the negative electrode material for a lithium ion secondary battery. A negative electrode for a lithium ion secondary battery according to the invention is prepared, for example, by mixing the negative electrode material for a lithium ion secondary battery, an organic binder, a dissolving medium, such as a solvent and water, as well as, if necessary, a thickener, an electric conduction aid, a heretofore known carbonaceous negative electrode material, etc. to prepare a coating liquid, applying (coating) the coating liquid onto a current collector, then removing the solvent or water, and pressing to form a negative electrode material layer. The material is generally kneaded with an organic binder, a solvent, etc. and formed to a sheet or pellets.

Although there is no particular restriction on the organic binder, examples thereof include a styrene-butadiene copolymer; a (meth)acrylic copolymer obtained by copolymerizing an ethylenic unsaturated carboxylic acid ester, such as methyl (meth)acrylate, ethyl (meth)acrylate, butyl (meth)acrylate, (meth)acrylonitrile, and hydroxyethyl (meth)acrylate, and an ethylenic unsaturated carboxylic acid, such as acrylic acid, methacrylic acid, itaconic acid, fumaric acid, and maleic acid; and a polymer, such as poly(vinylidene fluoride), poly(ethylene oxide), polyepichlorohydrin, polyphosphazene, polyacrylonitrile, polyimide, and polyamide-imide. Meanwhile, a "(meth)acrylate" means an "acrylate" and an "methacrylate" corresponding thereto. This holds true for a similar expression such as "(meth)acrylic copolymer".

Some of the organic binders are dispersed or dissolved in water and some others are dissolved in an organic solvent such as N-methyl-2-pyrrolidone (NMP) depending on the respective physical properties. Among others, an organic binder, whose main skeleton is polyacrylonitrile, polyimide or polyamide-imide is preferable from a viewpoint of superior adherence, and an organic binder whose main skeleton is polyacrylonitrile is more preferable from viewpoints of a low heat treatment temperature during production of a negative electrode and superior electrode flexibility as described below. As an organic binder whose main skeleton is polyacrylonitrile, for example, a product (LSR7 (trade name), made by Hitachi Chemical Co., Ltd., etc.), in which acrylic acid imparting adherence and a straight chain ether group imparting flexibility are added to a polyacrylonitrile skeleton, can be used.

The content of an organic binder in a negative electrode material layer of a negative electrode material for a lithium ion secondary battery is preferably from 0.1 mass-% to 20 mass-%, more preferably from 0.2 mass-% to 20 mass-%, and further preferably from 0.3 mass-% to 15 mass-%.

When the content of an organic binder is 0.1 mass-% or more, the adherence is superior, and breakage of a negative electrode due to expansion and contraction during charging and discharging tends to be suppressed. Meanwhile, when the content is 20 mass-% or less, increase in electrode resistance tends to be suppressed.

Further, as a thickener for adjusting the viscosity, carboxymethyl cellulose, methyl cellulose, hydroxymethyl cellulose, ethyl cellulose, poly(vinyl alcohol), poly(acrylic acid) (acrylate), oxidized starch, phosphorylated starch, casein, or the like may be used together with the organic binder.

There is no particular restriction on a solvent to be used for mixing an organic binder, and examples thereof include N-methylpyrrolidone, dimethylacetamide, dimethylformamide, and γ-butyrolactone.

To the coating liquid an electric conduction aid may be added. Examples of the electric conduction aid include carbon black, acetylene black, an oxide having electroconductivity, and a nitride having electroconductivity. The electric conduction aids may be used singly, or in a combination of 2 or more kinds. The content of an electric conduction aid is preferably from 0.1 mass-% to 20 mass-% with respect to a negative electrode material layer (100 mass-%).

There is no particular restriction on the material for a current collector, and examples thereof include aluminum, copper, nickel, titanium, stainless steel, a porous metal (metal foam), and carbon paper. There is no particular restriction on the form of a current collector, and examples thereof include a foil form, a perforated foil form, and a mesh form.

There is no particular restriction on a method for applying (coating) the coating liquid onto a current collector, and examples thereof include a metal mask printing method, an electrostatic coating method, a dip coating method, a spray coating method, a roll coating method, a doctor blade method, a gravure coating method, and a screen printing method. After coating, a pressure treatment is preferably performed by a flat plate press, a calender roll, or the like according to need.

Integration of a coating liquid formed into a sheet form, a pellet form, or the like and a current collector may be conducted by integration by rolling, or integration by pressing, or integration by a combination of the two.

A negative electrode material layer formed on a current collector, or a negative electrode material layer integrated with a current collector is preferably heat-treated depending on the organic binder used. For example, in a case in which an organic binder with a main skeleton of polyacrylonitrile is used, a heat treatment is conducted preferably at from 100° C. to 180° C., and in a case in which an organic binder with a main skeleton of polyimide or polyamide-imide is used, a heat treatment is conducted preferably at from 150° C. to 450° C.

By the heat treatment, the strength is highly intensified through removal of a solvent and curing of an organic binder, and internal adherence in a negative electrode material and adherence between a negative electrode material and a current collector can be improved. The heat treatment is preferably carried out in an inert atmosphere, such as helium, argon, and nitrogen, or in a vacuum atmosphere, in order to protect a current collector from oxidation during the treatment.

A negative electrode is preferably pressed (pressure-treated) prior to a heat treatment. By a pressure treatment the electrode density can be adjusted. The electrode density of a negative electrode for a lithium ion secondary battery according to the invention is preferably from 1.4 $g/cm^3$ to 1.9 $g/cm^3$, more preferably from 1.5 $g/cm^3$ to 1.85 $g/cm^3$, and further preferably from 1.6 $g/cm^3$ to 1.8 $g/cm^3$. The higher the electrode density is, the more the volumetric capacity of a negative electrode tends to be improved, and the more the internal adherence in a negative electrode material and the adherence between a negative electrode material and a current collector tend to be improved.

<Lithium Ion Secondary Battery>

A lithium ion secondary battery according to the invention is provided with a positive electrode, the negative electrode, and an electrolyte.

By placing the negative electrode, for example, facing to a positive electrode intercalating a separator, and by injecting therein an electrolytic solution containing an electrolyte, a lithium ion secondary battery can be constituted.

The positive electrode can be obtained similarly as the negative electrode by forming a positive electrode layer on the surface of a current collector. As a current collector for the positive electrode, a current collector similar to those described for the negative electrode can be used.

There is no particular restriction on a material to be used for a positive electrode of a lithium ion secondary battery according to the invention (also referred to as "positive electrode material"), insofar as it is a compound, which can be doped or intercalated with a lithium ion, and examples thereof include lithium cobaltate ($LiCoO_2$), lithium nickelate ($LiNiO_2$), and lithium manganate ($LiMnO_2$).

A positive electrode can be prepared, for example, by mixing the positive electrode material, an organic binder such as poly(vinylidene fluoride), and a solvent, such as N-methyl-2-pyrrolidone, and γ-butyrolactone to prepare a positive electrode coating liquid, applying (coating) the positive electrode coating liquid onto at least one surface of a current collector such as an aluminum foil, then removing the solvent by drying, and, if necessary, performing a pressure treatment.

To a positive electrode coating liquid an electric conduction aid may be added. Examples of the electric conduction aid include carbon black, acetylene black, an oxide having electroconductivity, and a nitride having electroconductivity. The electric conduction aids may be used singly, or in a combination of 2 or more kinds.

There is no particular restriction on an electrolyte solution to be used for a lithium ion secondary battery according to the invention, and a publicly known solution may be used. A nonaqueous lithium ion secondary battery can be produced, for example, using a solution in which an electrolyte is dissolved in an organic solvent as an electrolyte solution.

Examples of an electrolyte include $LiPF_6$, $LiClO_4$, $LiBF_4$, $LiClF_4$, $LiAsF_6$, $LiSbF_6$, $LiAlO_4$, $LiAlCl_4$, $LiN(CF_3SO_2)_2$, $LiN(C_2F_5SO_2)_2$, $LiC(CF_3SO_2)_3$, LiCl, and LiI.

There is no particular restriction on the organic solvent, insofar as it can dissolve the electrolyte, and examples thereof include propylene carbonate, ethylene carbonate, diethyl carbonate, ethyl methyl carbonate, vinyl carbonate, γ-butyrolactone, 1,2-dimethoxyethane, and 2-methyltetrahydrofuran.

As a separator, various publicly known separators can be also used. Specific examples include a paper separator, a polypropylene separator, a polyethylene separator, and a glass fiber separator.

According to an exemplary production process for a lithium ion secondary battery: two electrodes of a positive electrode and a negative electrode are wound up intercalating a separator; the obtained spirally wound-up body is inserted into a battery can; a tab terminal welded in advance to a current collector of the negative electrode is welded to the battery can bottom; an electrolyte solution is injected into the thus prepared battery can; and a tab terminal welded in advance to a current collector of the positive electrode is welded to a battery cover, which is then placed on top of the battery can intercalating an insulating gasket, followed by caulking of contact parts between the cover and the battery can for hermetical closure, thereby completing a battery.

There is no particular restriction on the shape of a lithium ion secondary battery according to the invention, and examples of a lithium ion secondary battery include a paper battery, a button battery, a coin battery, a layered battery, a cylindrical battery, and a rectangular battery.

Although a negative electrode material for a lithium ion secondary battery according to the invention is described as "for a lithium ion secondary battery", it can be applied to any and all electrochemical devices with a charge and discharge mechanism, in which a lithium ion is included and eliminated.

EXAMPLES

The invention will be described more specifically below by way of a synthesis example, Examples, and Comparative Examples, provided that the invention be not limited to the following Examples. Meanwhile, "part(s)" and "%" are by mass, unless otherwise specified.

Example 1

(Production of Negative Electrode Material)

Massive silicon oxide (10 mm to 30 mm-square, made by Kojundo Chemical Lab. Co., Ltd.) as an oxide of silicon was coarsely ground in a mortar to obtain a particle of an oxide of silicon. The particle of an oxide of silicon was ground further by a vibration mill (small size vibration mill NB-0, made by Nitto Kagaku Co., Ltd.), and the particle size is adjusted by a test sieve 300M (300 mesh) to obtain a fine particle with an average particle size of 5 μm.

<Measurement of Average Particle Size>

A measurement sample (5 mg) was placed in a 0.01 mass-% aqueous solution of a surfactant (ETHOMEEN T/15, made by Lion Corporation) and dispersed with a vibration stirrer. The obtained dispersion liquid was placed in a sample water tank of a laser diffraction particle size distribution analyzer (SALD3000J, made by Shimadzu Corporation) and a measurement was carried out by a laser diffraction method with circulation by a pump while applying ultrasonic waves. The measurement conditions were as follows. A diameter at 50% cumulative volume of the obtained particle size distribution (D50%) was defined as an average particle size. Measurements of average particle sizes in the following Examples were conducted identically.
Light source: red semiconductor laser (690 nm)
Absorbance: 0.10 to 0.15
Refractive index: 2.00-0.20i Into a mixing apparatus (ROCKING MIXER RM-10G, made by Aichi Electric Co., Ltd.), 995 g of the obtained fine particles of an oxide of silicon and 10 g of coal pitch (fixed carbon 50 mass-%) were charged, mixed for 5 min, and filled in an alumina-made heat treatment container. The filled heat treatment container was heat-treated in a controlled atmosphere baking furnace in a nitrogen atmosphere at 1000° C. for 5 hours to obtain a heat-treated product.

The obtained heat-treated product was disintegrated in a mortar and sieved out by a test sieve of 300M (300 mesh) to obtain a negative electrode material.

<Measuring Method of Carbon Content>

The carbon content of the negative electrode material was measured by a microwave calcination-infrared analysis method. A microwave calcination-infrared analysis method is an analysis method by which a sample is heated to be calcined in an oxygen flow in a microwave furnace, so that carbon and sulfur in the sample are converted to $CO_2$ and $SO_2$ respectively and then analyzed quantitatively by an infrared absorption method. A measuring apparatus and measurement conditions, etc. are as follows.
Apparatus: Carbon/sulfur determinator (CSLS600, made by Leco Japan Corporation)
Frequency: 18 MHz
Microwave output: 1600 W
Sample mass: approx. 0.05 g
Analysis time: Automated mode was selected in Setting mode of the apparatus.
Burning improver: Fe+W/Sn
Standard sample: LECO 501-024 (C: 3.03%±0.04, S: 0.055%±0.002) Number of measurements: 2 times (A value of carbon content in Table 2 is an average value of 2 measured values.)

<Measurement of R Value>

From a spectrum obtained using a Raman spectrometer (NSR-1000 Model, made by Jasco Corporation), the negative electrode material was analyzed based on a baseline within the following range. Measurement conditions were as follows.
Laser wavelength: 532 nm
Irradiation intensity: 1.5 mW (value measured by a laser power monitor)
Irradiation time: 60 sec
Irradiation area: 4 μm$^2$
Measurement range: 830 cm$^{-1}$ to 1940 cm$^{-1}$
Baseline: 1050 cm$^{-1}$ to 1750 cm$^{-1}$ The wave number of an obtained spectrum was corrected using a calibration curve obtained from differences between wave numbers of respective peaks found by a measurement under the same conditions with a reference material of indene (E. P. grade: Wako Pure Chemical Industries, Ltd.) and theoretical wave numbers of the respective peaks of indene.

Defining the intensity of a peak appearing near 1360 cm$^{-1}$ as Id, the intensity of a peak appearing near 1580 cm$^{-1}$ as Ig in a profile obtained after the correction, and the intensity ratio of both the peaks Id/Ig (D/G) was determined as R value.

<Measurement of BET Specific Surface Area>

Nitrogen adsorption was measured by a 5-point method at a liquid nitrogen temperature (77K) using an accelerated surface area and porosimeter (ASAP2020, made by Micromeritics Instrument Corporation), and a specific surface area was calculated by a BET method (relative pressure range: from 0.05 to 0.2).

<Measurement of Silicon Crystallite Size>

The negative electrode material was analyzed using a powder X-ray diffractometer (MULTIFLEX (2 kW), made by Rigaku Corporation). The silicon crystallite size was calculated from the half width of a peak assignable to the crystal face of Si (111) present near 2θ=28.4° using the Scherrer equation. Measurement conditions were as follows.
Radiation source: CuKα line (wavelength: 0.154056 nm)
Measurement range: 2θ=10° to 40°
Sampling step width: 0.02°
Scanning speed: 1°/min
Tube current: 40 mA
Tube voltage: 40 kV
Divergence slit: 1°
Scattering slit: 1°
Receiving slit: 0.3 mm An obtained profile was subjected to removal of background (BG) and separation of a peak using a structural analysis software attached to the apparatus (JADE6, made by Rigaku Corporation) with the following setting.
[Removal of Kα2 Peak and Removal of Background]
Intensity ratio Kα1/Kα2:2.0
Offset (σ) of BG curve from BG dot: 0.0
[Designation of Peak]
Peak assignable to Si (111): 28.4°±0.3°
Peak assignable to $SiO_2$: 21°±0.3°
[Peak Separation]
Profile Form Function: Pseudo-Voigt
Background Fixed By reading the half width of a peak assignable to Si (111) derived by the structural analysis software with the above setting, a silicon crystallite size was calculated by the following Scherrer equation.

$$D = K\lambda/B \cos\theta$$

$$B = (B_{obs}^2 - b^2)^{1/2}$$

D: Crystallite size (nm)
K: Scherrer constant (0.94)
λ: Radiation source wavelength (0.154056 nm)
θ: Found half width of peak angle
$B_{obs}$: Half width (Found value obtained from structural analysis software)
b: Found half width of standard silicon (Si)

(Production Method of Negative Electrode)

To 3.75 mass-% of a powder of the negative electrode material produced by the above technique and 71.25 mass-% of artificial graphite (made by Hitachi Chemical Co., Ltd.) as a carbonaceous negative electrode material (produced negative electrode material:artificial graphite=5:95 (mass ratio)), 15 mass-% of a powder of acetylene black (made by Denki Kagaku Kogyo K.K.) as an electric conduction aid, and LSR-7 (made by Hitachi Chemical Co., Ltd.) as a binder were added, and then the mixture was kneaded to prepare a homogeneous slurry. In this case, the addition amount of the binder was adjusted to 10 mass-% with respect to the total mass of the slurry. The slurry was coated on a glossy surface of an electrolytic copper foil to a coating amount of 10 mg/cm$^2$, which was then pre-dried at 90° C. for 2 hours and adjusted to a density of 1.65 g/cm$^3$ by a roll press. The above was then dried in a vacuum atmosphere at 120° C. for 4 hours for performing a curing treatment to complete a negative electrode.

(Production of Lithium Ion Secondary Battery)

A 2016 type coin cell was produced using the electrode produced above as a negative electrode, a metallic lithium as a counter electrode, a mixture liquid of ethylene carbonate/ethyl methyl carbonate (volume ratio=3:7) and vinyl carbonate (VC) (1.0 mass-%) containing 1 M of LiPF$_6$ as an electrolyte solution, a 25 μm-thick polyethylene microporous membrane as a separator, and a 250 μm-thick copper plate as a spacer.

(Battery Evaluation)

<First Discharge Capacity, Charge and Discharge Efficiency>

A battery produced as above was placed in a thermostatic chamber kept at 25° C., a constant current charging was carried out at 0.43 mA (0.32 mA/cm$^2$) to reach 0 V, then a constant voltage charging was further carried out at 0 V until the current attenuated to a value corresponding to 0.043 mA, and the first battery charge capacity was measured. After a rest for 30 min from the completion of charging, the battery was discharged, such that a discharge at 0.43 mA (0.32 mA/cm$^2$) was carried out down to 1.5 V and the first discharge capacity was measured. In this case, the capacity was reduced to a value per mass of a negative electrode material (total mass of a mixture of a produced negative electrode material and artificial graphite). The initial charge and discharge efficiency (%) was calculated as a value obtained by dividing the first discharge capacity by the first battery charge capacity.

Examples 2 to 6, Comparative Examples 2 and 3

A negative electrode material was produced identically with production of the negative electrode material in Example 1, except that the contents of an oxide of silicon and coal pitch were changed as in the following Table, and a similar evaluation was carried out.

TABLE 1

|  | Oxide of silicon [g] | Coal pitch [g] |
| --- | --- | --- |
| Example 2 | 990 | 20 |
| Example 3 | 980 | 40 |
| Example 4 | 970 | 60 |
| Example 5 | 960 | 80 |
| Example 6 | 955 | 90 |
| Comparative Example 2 | 950 | 100 |
| Comparative Example 3 | 920 | 160 |

Comparative Example 1

A negative electrode material was produced identically with production of the negative electrode material in Example 1, except that pitch was not mixed and only an oxide of silicon was heat-treated, and a similar evaluation was carried out. The evaluation results with respect to Examples and Comparative Examples are shown in the following Table 2.

TABLE 2

|  | Comparative Example 1 | Example 1 | Example 2 | Example 3 | Example 4 | Example 5 | Example 6 | Comparative Example 2 | Comparative Example 3 |
| --- | --- | --- | --- | --- | --- | --- | --- | --- | --- |
| Carbon content [mass-%] | 0.0 | 0.5 | 1.0 | 2.0 | 3.0 | 4.0 | 4.5 | 5.0 | 8.0 |
| R value (D/G) | — | 1.1 | 1.1 | 1.0 | 0.9 | 0.9 | 1.0 | 0.9 | 1.0 |
| BET specific surface area [m$^2$/g] | 1.8 | 2.0 | 2.1 | 2.0 | 2.5 | 2.8 | 3.0 | 3.4 | 5.2 |
| Average particle size hum | 5.0 | 5.0 | 5.0 | 5.5 | 5.5 | 6.0 | 6.0 | 6.0 | 6.5 |
| Silicon crystallite size [nm] | 4.0 | 4.0 | 4.0 | 4.0 | 4.0 | 4.0 | 4.0 | 4.0 | 4.0 |
| First battery charge capacity [mAh/g] | 419 | 450 | 450 | 450 | 447 | 446 | 446 | 444 | 444 |
| First discharge capacity [mAh/g] | 378 | 405 | 406 | 406 | 403 | 402 | 402 | 398 | 397 |
| Charge and discharge efficiency [%] | 90.2 | 90 | 90.2 | 90.2 | 90.2 | 90.1 | 90.1 | 89.6 | 89.4 |

As obvious from the results in Table 2, negative electrode materials for a lithium ion secondary battery shown in Examples 1 to 6 are materials having a higher first discharge capacity and superior in initial charge and discharge efficiency compared to Comparative Example 1 without carbon coating and Comparative Examples 2 and 3 having a carbon coat amount of 5 mass-% or more.

In a case in which only artificial graphite was used as a negative electrode material, the first battery charge capacity was 378 mAh/g, and the first discharge capacity was 355 Ah/g. Compared to the results of this case in which only artificial graphite was used, in Examples, in which a negative electrode material contains 5 mass-% of a negative electrode material according to the invention and 95 mass-% of artificial graphite, despite such a low content of a negative electrode material according to the invention, it is obvious that the first battery charge capacity as well as discharge capacity are improved remarkably.

The entire contents of the disclosures by Japanese Patent Application No. 2012-237256 are incorporated herein by reference.

All the literature, patent literature, and technical standards cited herein are also herein incorporated to the same extent as provided for specifically and severally with respect to an individual literature, patent literature, and technical standard to the effect that the same should be so incorporated by reference.

The invention claimed is:

1. A negative electrode material for a lithium ion secondary battery, comprising:
  a negative electrode material (SiOx-C) that includes an oxide of silicon and silicon crystallites, and carbon over a part or a whole of a surface of the oxide of silicon; and
  a carbonaceous negative electrode material that includes at least one selected from the group consisting of natural graphite, artificial graphite, and amorphous carbon, wherein:
  a content of the carbon with respect to the whole negative electrode material (SiOx-C) is from 0.5 mass % to 4.5 mass %; and
  a crystallite size of the silicon crystallites that are included in the negative electrode material (SiOx-C) is 3 nm or more and 6 nm or less;
  the carbon that is included in the negative electrode material (SiOx-C) comprises low crystallinity carbon, and has an R value, defined as a ratio Id/Ig of a peak Id in a profile obtained by laser Raman spectrometry with an excitation wavelength of 532 nm observed between 1300 $cm^{-1}$ and 1400 $cm^{-1}$ to a peak Ig in a profile obtained by laser Raman spectrometry with an excitation wavelength of 532 nm observed between 1530 $cm^{-1}$ and 1630 $cm^{-1}$, of from 0.7 to 1.3;
  the oxide of silicon that is included in the negative electrode material (SiOx-C) is represented by a formula SiOx (x is 0<x≤2); and
  a ratio of the negative electrode material (SiOx-C) with respect to the carbonaceous negative electrode material (C) is from 0.1:99.9 to 20:80 in terms of mass.

2. The negative electrode material for a lithium ion secondary battery according to claim 1, wherein the crystallite size of the silicon crystallites is from 2 nm to 8 nm.

3. The negative electrode material for a lithium ion secondary battery according to claim 1, wherein the crystallite size of the silicon crystallites is from 3 nm to 6 nm.

4. The negative electrode material for a lithium ion secondary battery according to claim 1, wherein the carbon comprises low crystallinity carbon, and has an R value, defined as a ratio Id/Ig of a peak Id in a profile obtained by laser Raman spectrometry with an excitation wavelength of 532 nm observed between 1300 $cm^{-1}$ and 1400 $cm^{-1}$ to a peak Ig in a profile obtained by laser Raman spectrometry with an excitation wavelength of 532 nm observed between 1530 $cm^{-1}$ and 1630 $cm^{-1}$, of 0.5 or more.

5. The negative electrode material for a lithium ion secondary battery according to claim 4, wherein the carbon has an R value of from 0.7 to 1.3.

6. The negative electrode material for a lithium ion secondary battery according to claim 4, wherein the carbon has an R value of from 0.8 to 1.2.

7. The negative electrode material for a lithium ion secondary battery according to claim 1, wherein a diffraction peak assignable to Si (111) is observed when the negative electrode material (SiOx-C) is subjected to a powder X-ray diffraction (XRD) analysis.

8. The negative electrode material for a lithium ion secondary battery according to claim 1, wherein the oxide of silicon is represented by a formula SiOx (x is 0<x≤2).

9. The negative electrode material for a lithium ion secondary battery according to claim 1, further comprising a carbonaceous negative electrode material (C) that includes at least one selected from the group consisting of natural graphite, artificial graphite, and amorphous carbon.

10. The negative electrode material for a lithium ion secondary battery according to claim 9, wherein a ratio of the negative electrode material (SiOx-C) with respect to the carbonaceous negative electrode material (C) is from 0.1:99.9 to 20:80 in terms of mass.

11. The negative electrode material for a lithium ion secondary battery according to claim 9, wherein the crystallite size of the silicon crystallites that is included in the negative electrode material (SiOx-C) is from 2 nm to 8 nm.

12. The negative electrode material for a lithium ion secondary battery according to claim 9, wherein the crystallite size of the silicon crystallites that is included in the negative electrode material (SiOx-C) is from 3 nm to 6 nm.

13. The negative electrode material for a lithium ion secondary battery according to claim 9, wherein the carbon that is included in the negative electrode material (SiOx-C) comprises low crystallinity carbon, and has an R value, defined as a ratio Id/Ig of a peak Id in a profile obtained by laser Raman spectrometry with an excitation wavelength of 532 nm observed between 1300 $cm^{-1}$ and 1400 $cm^{-1}$ to a peak Ig in a profile obtained by laser Raman spectrometry with an excitation wavelength of 532 nm observed between 1530 $cm^{-1}$ and 1630 $cm^{-1}$, of 0.5 or more.

14. The negative electrode material for a lithium ion secondary battery according to claim 13, wherein the carbon that is included in the negative electrode material (SiOx-C) has an R value of from 0.7 to 1.3.

15. The negative electrode material for a lithium ion secondary battery according to claim 9, wherein the oxide of silicon that is included in the negative electrode material (SiOx-C) is represented by a formula SiOx (x is 0<x≤2).

16. A negative electrode for a lithium ion secondary battery, comprising:
  a current collector; and
  a negative electrode material layer provided on the current collector and comprising the negative electrode material according to claim 1.

17. A lithium ion secondary battery, comprising:
  a positive electrode;
  the negative electrode for a lithium ion secondary battery according to claim 16; and
  an electrolyte.

18. A negative electrode material for a lithium ion secondary battery, comprising:
- a negative electrode material (SiOx-C) that includes an oxide of silicon and silicon crystallites, and carbon over a part or a whole of a surface of the oxide of silicon and
- a carbonaceous negative electrode material that includes at least one selected from the group consisting of natural graphite, artificial graphite, and amorphous carbon, wherein:
- a content of the carbon with respect to the whole negative electrode material (SiOx-C) is from 0.5 mass % to 4.5 mass %;
- a crystallite size of the silicon crystallites that are included in the negative electrode material (SiOx-C) is 3 nm or more and 6 nm or less;
- the carbon that is included in the negative electrode material (SiOx-C) comprises low crystallinity carbon, and has an R value, defined as a ratio Id/Ig of a peak Id in a profile obtained by laser Raman spectrometry with an excitation wavelength of 532 nm observed between 1300 $cm^{-1}$ and 1400 $cm^{-1}$ to a peak Ig in a profile obtained by laser Raman spectrometry with an excitation wavelength of 532 nm observed between 1530 $cm^{-1}$ and 1630 $cm^{-1}$, of from 0.7 to 1.3;
- the oxide of silicon that is included in the negative electrode material (SiOx-C) is represented by a formula SiOx (x is 0<x≤2); and
- a ratio of the negative electrode material (SiOx-C) with respect to the carbonaceous negative electrode material (C) is from 0.1:99.9 to 20:80 in terms of mass.

* * * * *